United States Patent
Hochstrasser et al.

(10) Patent No.: US 7,051,710 B2
(45) Date of Patent: May 30, 2006

(54) METHOD AND DEVICE FOR CONTROLLING AN INTERNAL COMBUSTION ENGINE

(75) Inventors: Patrick Hochstrasser, Tamm (DE); Christina Sauer, Benningen (DE); Gholamabas Esteghlal, Ludwigsburg (DE); Georg Mallebrein, Korntal-Muenchingen (DE); Eberhard Klein, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/492,235

(22) PCT Filed: Sep. 6, 2002

(86) PCT No.: PCT/DE02/03311

§ 371 (c)(1), (2), (4) Date: Dec. 22, 2004

(87) PCT Pub. No.: WO03/033894

PCT Pub. Date: Apr. 24, 2003

(65) Prior Publication Data

US 2005/0115542 A1 Jun. 2, 2005

(30) Foreign Application Priority Data

Oct. 8, 2001 (DE) .............................. 101 49 477

(51) Int. Cl.
*F02P 5/15* (2006.01)
*F02D 41/04* (2006.01)
*G06F 19/00* (2006.01)

(52) U.S. Cl. .................. 123/406.23; 123/350; 701/111

(58) Field of Classification Search ................ 123/294, 123/295, 305, 350, 352, 361, 406.23, 436, 123/480; 701/101, 102, 103, 110, 111, 115; 73/117.3

See application file for complete search history.

(56) References Cited

U.S. PATENT DOCUMENTS

| 5,558,178 | A | | 9/1996 | Hess et al. ................... 701/101 |
|---|---|---|---|---|
| 5,692,471 | A | | 12/1997 | Zhang ........................ 123/350 |
| 5,765,527 | A | * | 6/1998 | Lehner et al. ........... 123/339.1 |
| 5,832,891 | A | | 11/1998 | Paul ....................... 123/198 F |
| 5,954,026 | A | * | 9/1999 | Stoss et al. ................. 701/111 |
| 6,125,322 | A | * | 9/2000 | Bischof et al. ............. 123/350 |
| 6,148,795 | A | * | 11/2000 | Gerhardt et al. ............ 123/350 |
| 6,205,973 | B1 | | 3/2001 | Bauer et al. ................. 123/294 |
| 6,237,563 | B1 | | 5/2001 | Froehlich et al. ........... 123/350 |

FOREIGN PATENT DOCUMENTS

| DE | 42 39 711 | 6/1994 |
|---|---|---|
| DE | 195 45 221 | 6/1997 |

(Continued)

*Primary Examiner*—Willis R. Wolfe, Jr.
(74) *Attorney, Agent, or Firm*—Kenyon & Kenyon LLP (57) ABSTRACT

A method, a device and a computer program for controlling an internal combustion engine, in which a torque model is used within the framework of calculating instantaneous variables and/or actuating variables. In doing so, a basic value ascertained under standard conditions is corrected as a function of the inert-gas rate and/or the valve-overlap angle. Moreover, to further improve the accuracy of the model, the efficiency for the conversion of the chemical energy into mechanical energy by which the optimum torque value is corrected, is determined as a function of the deviation between optimum ignition angle and an instantaneous ignition angle as well as an additional variable representing the combustion performance of the mixture. The latter is the optimum ignition angle.

11 Claims, 6 Drawing Sheets

FOREIGN PATENT DOCUMENTS

| | | |
|---|---|---|
| DE | 197 45 682 | 4/1999 |
| EP | 1 045 235 | 10/2000 |
| GB | 2271198 A * | 4/1994 |
| WO | WO 95/24550 | 9/1995 |

* cited by examiner

METHOD AND DEVICE FOR CONTROLLING AN INTERNAL COMBUSTION ENGINE

RELATED APPLICATION INFORMATION

This application, which is the U.S. national phase application for PCT/DE02/03311, filed Sep. 6, 2002, claims priority to and the benefit of German patent application no. 101 49 477.7, filed on Oct. 8, 2001.

1. Field of the Invention

The present invention is directed to a method, a device, and a computer program for controlling an internal combustion engine.

2. Background Information

To control an internal combustion engine, German patent publication no. 42 39 711 (which corresponds to U.S. Pat. No. 5,558,178) refers to converting a setpoint value for a torque of the internal combustion engine into an actuating variable for influencing the air supply to the internal combustion engine, for setting the ignition angle and/or for suppressing or connecting the fuel supply to individual cylinders of the internal combustion engine. In addition, the control of the fuel/air ratio for realizing the predefined torque value is referred to in International PCT patent application no. WO-A 95/24550 (which corresponds to U.S. Pat. No. 5,692,471). Furthermore, in these approaches the actual torque of the internal combustion engine is calculated by taking the actual engine settings into account (charge, fuel metering and ignition angle). Among others, the engine speed, load (air mass, pressure etc.) and possibly the exhaust-gas composition are utilized.

A torque model for the internal combustion engine, which is utilized both for determining the actuating variables and also for determining the actual values, is used within the framework of these calculations. In this model, values for an optimum torque of the internal combustion engine and for an optimum ignition angle are determined as a function of operating points, and these values are then corrected via efficiency values according to the actual setting of the internal combustion engine.

To optimize this model, German patent publication no. 195 45 221 (which corresponds to U.S. Pat. No. 5,832,897) refers to correcting the value for the optimum ignition angle as a function of variables that influence the efficiency of the internal combustion engine, such as exhaust-recirculation rate, engine temperature, intake-air temperature, valve-overlap angle, etc.

In practice, however, this approach may still be optimized further, especially with respect to simplicity of application, optimizing the computing time and/or considering the working-point dependency of the correction of the optimum ignition angle, especially the dependency on the inert-gas rate. The above-discussed torque model, in particular, may fail to deliver satisfactory results in some operating states. Such operating states are especially states having high inert-gas rates, i.e., states having a large portion of inert gas (due to external or internal exhaust-gas recirculation), caused by overlapping intake and discharge-valve opening times and, above all, in small to medium fresh-air charges. Furthermore, these are operating states having high charge movements. Since these effects are not sufficiently taken into account, the calculated basic variables may not achieve an accurate torque calculation when these other procedures are utilized.

Figure 3:
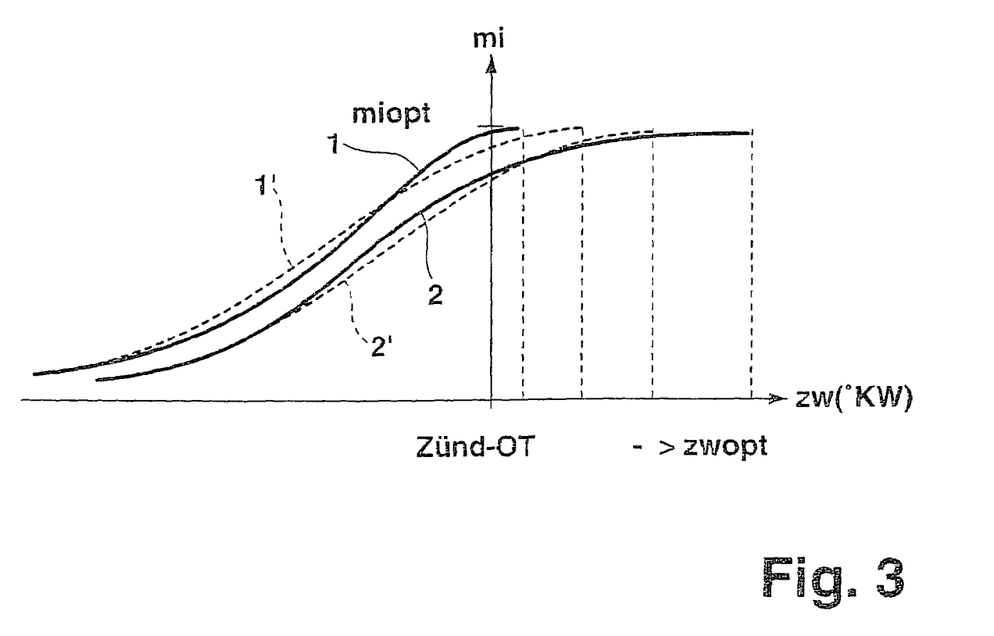
FIG. 3 shows a diagram illustrating the dependency of engine torque MI on the optimum ignition angle for mixtures having different combustibility and the curve approximated by optimization, in both cases for an available torque model.

Moreover, it is also problematic that the above-discussed model, while considering essential influences on the ignition angle in determining the maximum torque, may fail to take into account the different slopes of the correlation between ignition angle and the maximum engine torque able to be attained in the instantaneous operating point of the engine in different mixtures. A compromise must thus be found in optimizing the above-discussed model, which usually consists of the optimum ignition angle no longer coinciding with the ignition angle of the best torque. For example, in mixtures having excellent combustibility, which have a considerably retarded ignition angle when generating the best torque, the optimum ignition angle lies markedly later than this ignition angle, whereas, in mixtures having poor combustibility, it occurs much earlier than the ignition angle at which the maximum torque is generated. This characteristic is sketched in FIG. 3. The dashed line represents the curve provided by optimization of the available model. It can be seen that the actual and the model curve no longer coincide precisely. In one application example, at the best possible, optimum ignition angle, a torque fault of up to 20% has resulted relative to optimum torque MIopt.

It is obvious, therefore, that the greater the variation in the steepness of the ignition hooks (correlation between optimum ignition angle zwopt and torque MI in relation to top dead center of ignition phase Ignition-TDC for an operating point of the engine), the greater the deviation between the optimum ignition angle and maximum ignition angle at which maximum torque is attained in mixtures having excellent combustibility and those having poor combustibility, and the greater the errors of the torque model. A population for the model, in particular for the optimum ignition angle, cannot be found by the available optimizer of the model parameters, so that the torque model exhibits low tolerance across the entire ignition-angle range.

Consequently, there is a need to further optimize the torque model, in particular with respect to engine-control systems having high inert-gas rates, such as engine-control systems having variable valve adjustment and/or charge-movement flap.

SUMMARY OF THE INVENTION

Taking the inert-gas rates and/or charge-movement effects into account when determining the optimum torque for an internal combustion engine within the framework of a torque model, improves and, in particular, simplifies the model's application and shortens the computing time. Furthermore, by taking the operating point into account in correcting the optimum ignition angle as a function of the inert-gas rate, the working-point dependency of this correction is considered and the torque model substantially improved.

This measure may yield a very accurate indicated engine torque calculated with the aid of the model even when high overlap of the intake and discharge valves is present and/or high inert-gas rates at low charges of the internal combustion engine. The improved model is therefore believed to be particularly suited for internal combustion engines having continuously adjustable intake and discharge valves, or intake and discharge valves that are adjustable by switching, or for internal combustion engines having external exhaust-gas recirculation.

High torque accuracy may be achieved in an especially advantageous manner when, for instance via an interface with a transmission-control device, a reduction in the ignition angle efficiency is requested.

It may be particularly advantageous that a torque model is provided that considerably improves the accuracy of the torque model as well as the match between the optimum ignition angle and the ignition angle of the best (maximum) torque. It is especially advantageous that this model is invertible, i.e., that it not only allows a calculation of a setpoint ignition angle at a given setpoint torque and a given charge, but also the calculation of a setpoint charge at the given setpoint torque and given basic ignition angle efficiency, as well as a calculation of the actual torque.

In what be an especially advantageous manner, the torque model for calculating the indicated engine torque is distinguished by high precision even for highly divergent ignition curves and by excellent agreement between the optimizing variable of the optimum ignition angle and the ignition angle at the best possible torque.

Furthermore, simple applicability of the basic ignition angle actually to be set is achieved, and the model may be used for all engine configurations, that is, for engines having exhaust recirculation, variable camshaft control, variable valve lift, valve shutoff and/or charge-movement flap.

DETAILED DESCRIPTION

Figure 1:
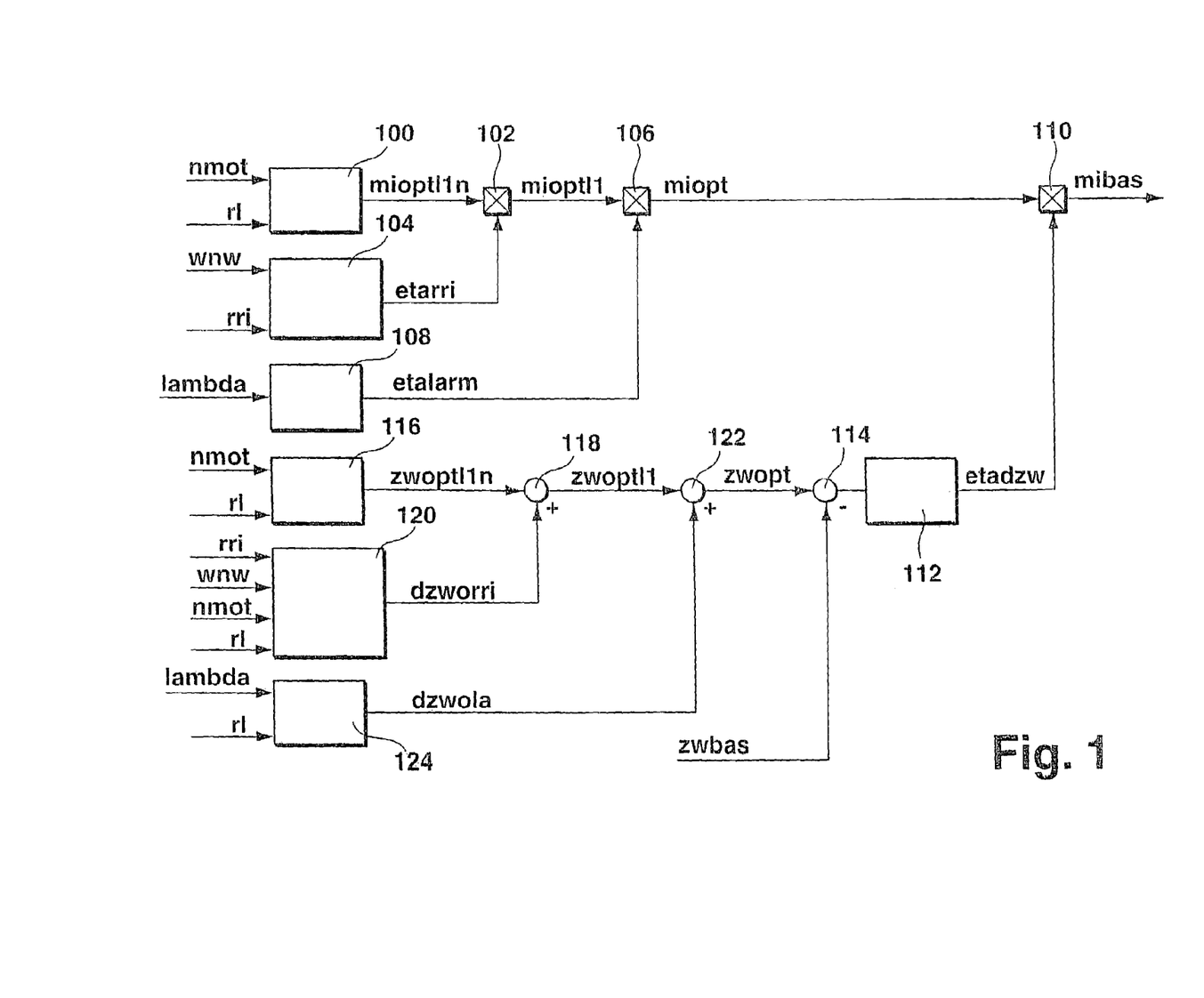
FIG. 1 shows a flow chart of a first embodiment of the utilized model.

FIG. 1 shows a flow chart of a first exemplary embodiment for improving the torque model. FIG. 1 describes a program of a microcomputer, the individual elements of the drawing in FIG. 1 representing programs, program steps or program parts, while the arrows describe the flow of information. Shown is the calculation of the actual basic torque, i.e., the torque that results when the basic ignition angle is set, which is selected from a characteristics map as a function of speed and load.

A correction of the optimum torque value takes place in the model shown in FIG. 1, taking the inert-gas rate and the charge movement into account, and a correction of the optimum ignition angle value, taking the inert-gas rate and the charge movement into consideration, and thus the instantaneous working point.

In a first ignition map 100, a value mioptlln for the optimum torque is read out as a function of engine speed nmot and actual charge rl, which is determined from the measured air-mass flow, taking a suction-manifold model into account. The ignition-map values of ignition map 100 are determined under defined, optimum marginal conditions, in particular when the lambda value has a standard value (1, for example), an optimum ignition angle has been set and efficiency etarri for the valve overlap (inert-gas rate and charge movement) has a standard value (for example, 1). In a multiplication point 102, the optimum torque value is multiplied by efficiency etarri, which describes the deviation with respect to the valve overlap from the standard value. Efficiency etarri is generated in ignition map 104 as a function of signals representing an inert-gas rate by internal and external exhaust-gas recirculation as well as the charge movement.

A signal rri for the internal and external inert-gas rate has shown to be useful, which is calculated as a function of the setting of the exhaust-gas return valve and the settings of the intake and discharge valves. The inert-gas rate describes the share of the inert gas in the overall aspirated gas mass. Another way of calculating the inert-gas rate is based on the temperature of the recirculated exhaust-gas flow, on lambda, the instantaneous air charge and the exhaust-gas pressure. A signal wnw, which represents the opening angle (relative to the crankshaft or the camshaft) of the intake valve, has proven suitable for taking the charge movement into account. In other exemplary embodiments, the position of a charge-movement flap or a variable representing the lift and the opening phase of the intake valves is utilized.

As a function of these instantaneous variables, efficiency etarri is determined, which describes the deviation between the torque value attributable to the inert gas and the charge movement and the torque value determined under standard conditions on which the determination of ignition map 100 is based. In a further multiplication point 106, optimum torque value mioptll, generated via the correction in multiplication point 102, is multiplied by lambda efficiency etalam, which is ascertained in a characteristic curve 108 as a function of the instantaneous exhaust-gas composition lambda. The result is an optimum torque value miopt that considers the instantaneous operating state of the internal combustion engine and its deviation from the standard values, which serves as the basis for determining the optimum torque values. Therefore, Miopt is the optimum value for the indicated torque at an optimum ignition angle. To generate basic torque mibas from which the instantaneous torque may then be derived, the basic ignition-angle setting relative to the optimum ignition-angle setting must therefore be taken into account. This takes place in multiplication point 110 where optimum torque value miopt is corrected by ignition-angle efficiency etadzw.

Ignition-angle efficiency etadzw is generated from a characteristic curve 112 as a function of the deviation, calculated in 114, between basic ignition angle zwbas and optimum ignition angle zwopt. Therefore, efficiency etadzw determines the effect of the deviation between the basic ignition angle and the optimum ignition-angle value on the torque of the internal combustion engine. The basic ignition angle corresponds to the ignition angle read out from a basic ignition-angle ignition map as a function of speed and load. It does not necessarily correspond to the actually set ignition angle to be taken into account, in the form of an additional efficiency, when determining the actual torque as a function of the basic torque. The optimum ignition-angle value is read out from ignition map 116 as a function of engine speed nmot and charge rl. The read-out optimum ignition-angle value zwoptlln is transmitted to a node 118 where this value is corrected by correction value dzworri.

This correction value is generated in an ignition map 120 as a function of inert-gas rate rri, signal wnw for considering the charge movement, and as a function of the signals representing the instantaneous operating point, engine speed nmot and instantaneous charge rl. Optimum ignition-angle value zwoptll, corrected in this way, is corrected by a correction value dzwola in an additional node 122, this value representing a lambda correction value, which is ascertained in ignition map 124 as a function of lambda and instantaneous charge RL. The corrections in nodes 118 and 122 may be implemented by addition. This approach has shown to be suitable since the instantaneous operating point of the internal combustion engine must then be taken into account in the correction values, too. Value zwopt resulting in 122 represents the optimum ignition-angle value, which is compared in node 114 to the basic ignition angle.

The aforementioned operating states having high inert-gas rates and charge movements and small to medium fresh-air charges are also governed in a satisfactory manner by the described model. It is essential in this context that a correction of the optimum ignition angle and a correction of the optimum torque takes place in the torque model. The optimum ignition angle is made up of a basic value as a function of load and speed and additive corrections as a function of the inert-gas rate; the settings of the intake and discharge valves or the valve overlap; of lambda; load and speed. The optimum torque is made up of a basic variable as a function of load and speed and multiplicative corrections as a function of the inert-gas rate and the settings of the intake and discharge valves; lambda; and the ignition-angle efficiency relative to the basic ignition angle.

A software tool is used to determine the parameters of the model. This tool is able to optimize the model parameters from the measured input variables and the measured torque, in such a way that the error square remains as small as possible across all measuring points. An example of such a software tool is referred to in German patent publication no. DE 197 45 682.

Basic torque mibas determined by the model is processed further in a variety of ways. Taking the efficiency of the actual ignition-angle setting into account, the instantaneous torque is calculated. Another evaluation consists of determining the ignition-angle setting, and using the difference between setpoint torque and basic torque to correct the ignition-angle setting.

The model described in FIG. 1 illustrates the calculation of the instantaneous torque from various operating variables. By inverting the model, analogously to the model of the related art mentioned in the introduction, the model is also used to determine the actuating variables (such as ignition angle, lambda, etc.) as a function of the setpoint-torque value or of the deviation between setpoint torque and basic torque or instantaneous torque.

The model may also be formulated as follows:

$$mibas = f1(nmot, rl) * f21(rri) * f22(wnw) * f3(\square) * f4(zwopt - zwbas)$$

or, related to the instantaneous torque:

$$miist = f1(nmot, rl) * f21(rri) * f22(wnw) * f3(\square) * f4(zwopt - zwist)$$

By inverting the model, the actuating variables, such as an ignition-angle setpoint value zwsoll, may be derived:

$$zwsetpoint = zwopt - f4^{-1}[misetpoint/(f21(rri) * f22(wnw) * f3(\square))]$$

The ignition maps and characteristic curves used to calculate the model are determined for each engine type within the framework of the application, possibly using the aforementioned software tool.

Figure 2:
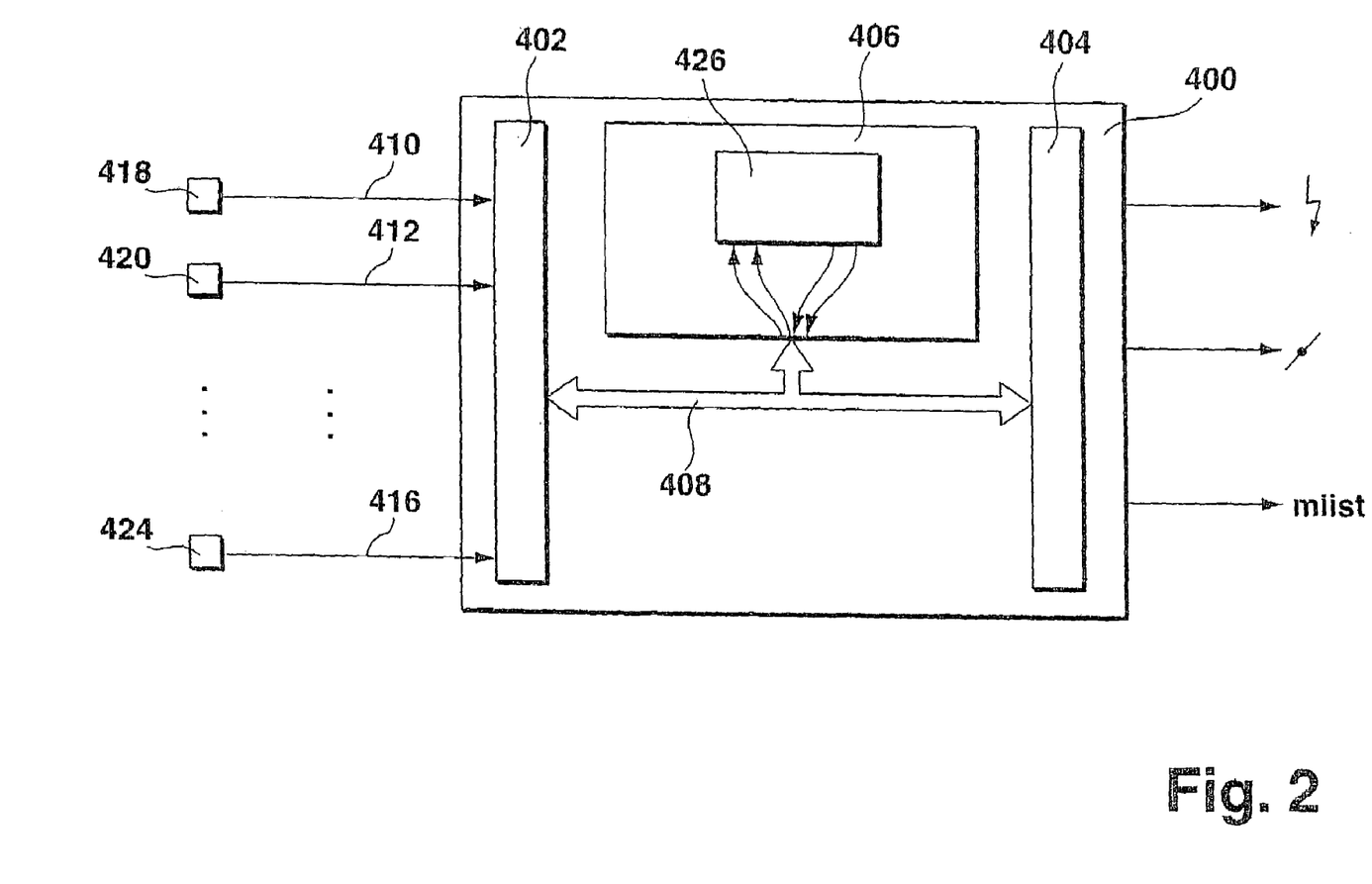
FIG. 2 shows a general diagram of an engine control in which the sketched model is used.

FIG. 2 shows a control unit 400, which includes an input circuit 402, an output circuit 404 and a microcomputer 406. These components are connected to a bus system 408. The performance quantities to be evaluated for controlling the engine, which are detected by measuring devices 418, 420 through 424, are transmitted via input lines 410 and 412 through 416. The performance quantities required to calculate the model are shown above. The measured and possibly processed performance-quantity signals are then read in by the microcomputer via bus system 408. The commands used for the model calculation are stored as computer program in microcomputer 406 itself, namely in its memory. This is symbolized in FIG. 2 by 426. The model results, which, if appropriate, are processed further in other programs (not shown), are then transmitted by the microcomputer to output circuit 404 via bus system 408. Output circuit 404 then outputs trigger signals as actuating variables for adjusting the ignition angle and the air supply, for example, and measured variables, such as instantaneous torque Miist.

The afore-described torque model does consider operating states having high inert-gas rates and charge-movement effects, but fails to take into account the varying steepness of the ignition hooks. Decisive for converting chemical into mechanical energy (indicated torque) is the combustion center point, i.e., the crankshaft angle at which half of the combustion energy, for example, is converted. Measurements have shown this crankshaft angle to be largely independent of the engine speed, the engine load and the residual-gas concentration, and representable as general correlation between combustion center point and indicated torque. The best-possible conversion of chemical energy is attained at a combustion center point of 8° crankshaft angle after top dead center.

Moreover, the following additional correlation applies. Shifting the ignition angle toward retarded by a specific angle amount also retards the combustion center point. This retardation is not constant, however. For example, if a very advanced ignition (60° crankshaft angle before TD) is delayed by 10°, the ignition spark arrives at a time when the pressure and temperature have increased significantly in the meantime, due to the compression. The ignition thus occurs more rapidly, the ignition retarded by 10° delaying the combustion center point by only a few degrees (4°, for example). This means that the internal torque of the engine has also been only slightly reduced, despite the 10° ignition retardation. This is classically the case in operating points having mixtures with extremely poor combustibility (low fresh-gas charge, high residual-gas charge, low combustion-chamber temperature, low charge movement).

Mixtures having excellent combustibility (high charge movement, high fresh-gas charge, low residual-gas charge, high combustion-chamber temperature) require no advanced ignition angle. The ignition angle for maximum torque lies in the region of 5°–10° before top dead center. However, if ignition now takes place 10° later, the ignition phase no longer profits from the increasing pressure and temperature. If the ignition only takes place during the downward travel of the piston, the speed of the pressure generation is reduced in the beginning of the energy conversion, the ignition is retarded and the combustion center point is shifted toward retarded by more than only the ignition-angle shift. The ignition-angle hook (correlation between torque and ignition angle for different optimum ignition angles) is considerably steeper.

In a given mixture and given marginal conditions (charge movement, temperature), the steepness of the ignition-angle hook thus lies . . . the ignition angle at which maximum torque results. In other words: if the best-possible ignition angle is advanced, a flat ignition hook results; if it is retarded, a steeper ignition hook results. When generating the torque model, this behavior is taken into account in that a variable is used that is typical for the ignition performance of the mixture and, derived therefrom, in that a more or less steep torque characteristic is selected from at least two predefined characteristics. One example of such a variable is the optimum ignition angle. Using this knowledge, the following torque model is generated.

Figure 4:
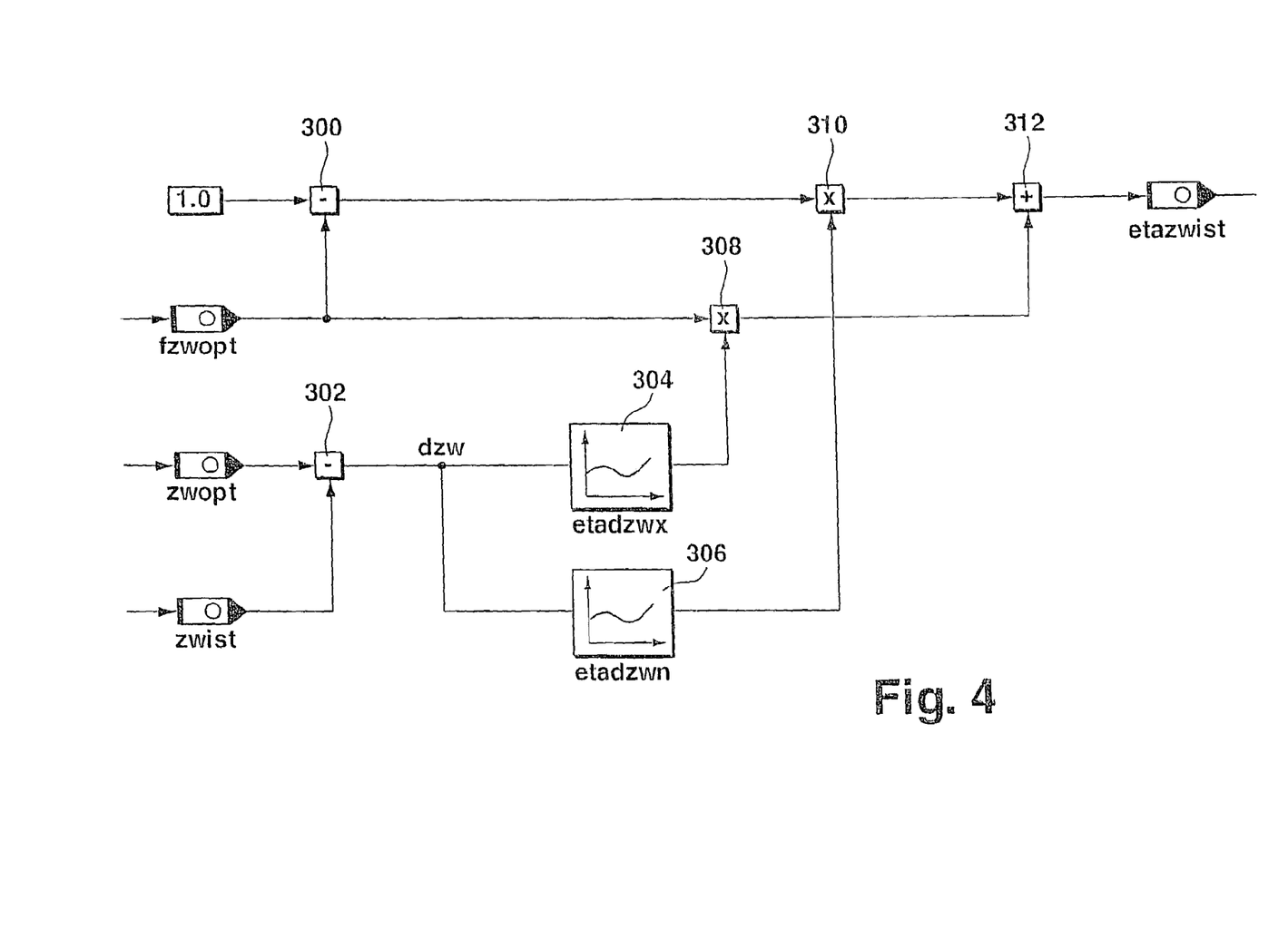
FIG. 4 shows a flow chart for calculating the actual or instantaneous ignition angle efficiency etazwist.
Figure 6:
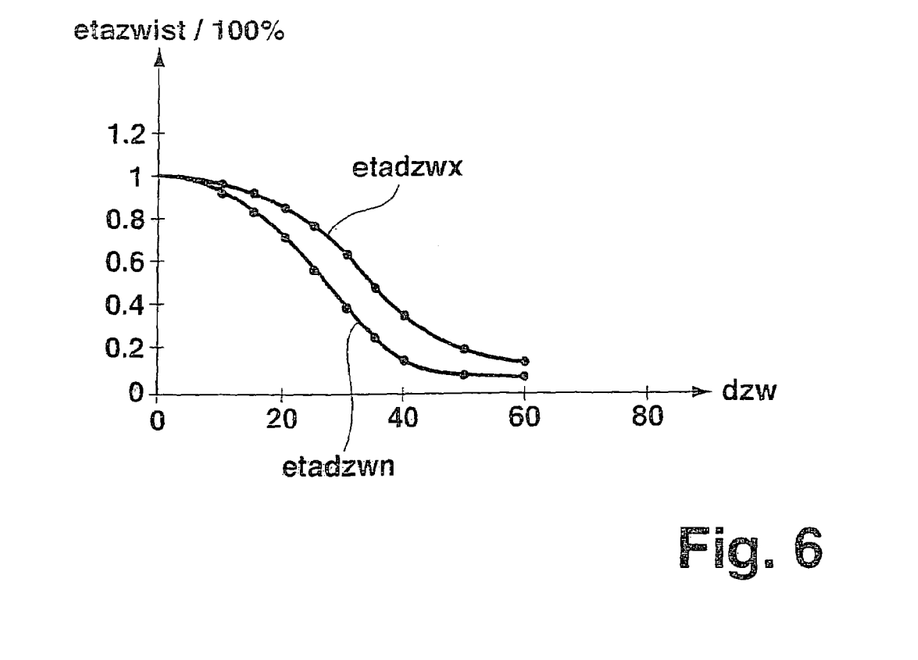
FIG. 6 shows an example of the characteristics maps used for determining the ignition-angle efficiency.

In the flow chart of FIG. 4, the various blocks represent program steps, program parts or programs, while the connecting lines represent the information flow. Illustrated is the calculation of the actual or instantaneous ignition-angle efficiency etazwist. This efficiency describes the deviation between instantaneous ignition angle zwist and the optimum ignition angle and the effect of this deviation on the torque. In order to consider the afore-described correlations, two characteristics, etadzwn and etazwdx, are provided. The characteristics represent characteristic curves of the efficiency above (versus) the deviation between instantaneous ignition angle and optimum ignition angle. One characteristic curve (etadzwn) is steep in this case, the other (etadzwx) is flat. FIG. 6, in which the two characteristic curves are shown, is an example of such characteristic curves. The flatter characteristic curve is to be used for an advanced, optimum ignition angle, the steeper one for a later, optimum ignition angle.

To also express this when determining the instantaneous ignition angle, the generation of a factor fzwopt is provided as well. This factor is determined from the optimum ignition angle and two applicable ignition-angle variables, ZWOPTMN and ZWOPTMX, by ratio formation from instantaneous optimum ignition angle and the two applicable variables, for example. In one exemplary embodiment, 0° crankshaft angles haven proven useful for ignition-angle value ZWOPTMN, and 60° crankshaft angles for ignition-angle value ZWOPTMX.

According to FIG. 4, factor fzwopt generated in this manner is first deducted from value 1 in a subtraction point 300. In an additional subtraction point 302, the deviation between optimum ignition angle zwopt, generated from an ignition map as shown in the introduction, and the instantaneously set ignition angle zwist is calculated. This deviation DZW is forwarded to characteristic curve 304 (etadzwx) and characteristic curve 306 (etadzwn). From these two characteristic curves, an efficiency value is read out for each of the provided individual optimum ignition angles. In multiplication step 308, the value of ignition map 304 is multiplied by factor fzwopt, while the ignition-angle efficiency of characteristic curve 306 is multiplied in multiplication step 310 by the value 1, reduced by factor fzwopt. In an addition point 112, these two variables are then added to ignition-angle efficiency etazwist. Thus, the following results for the ignition-angle efficiency:

$$etwazwist = etadzwx*fzwopt + (etadzwn*(1-fzwopt))$$

If optimum ignition angle zwopt thus lies in the range of the smaller ignition-angle value ZWOPTMN, steeper characteristic curve etadzwn is used as torque characteristic. In very advanced optimum ignition angles, factor fzwopt goes toward 1 and flatter characteristic curve etadzwmx takes effect. Between the extreme values, the characteristic-curve contributions are used in a weighted manner to determine the ignition-angle efficiency.

Figure 5:
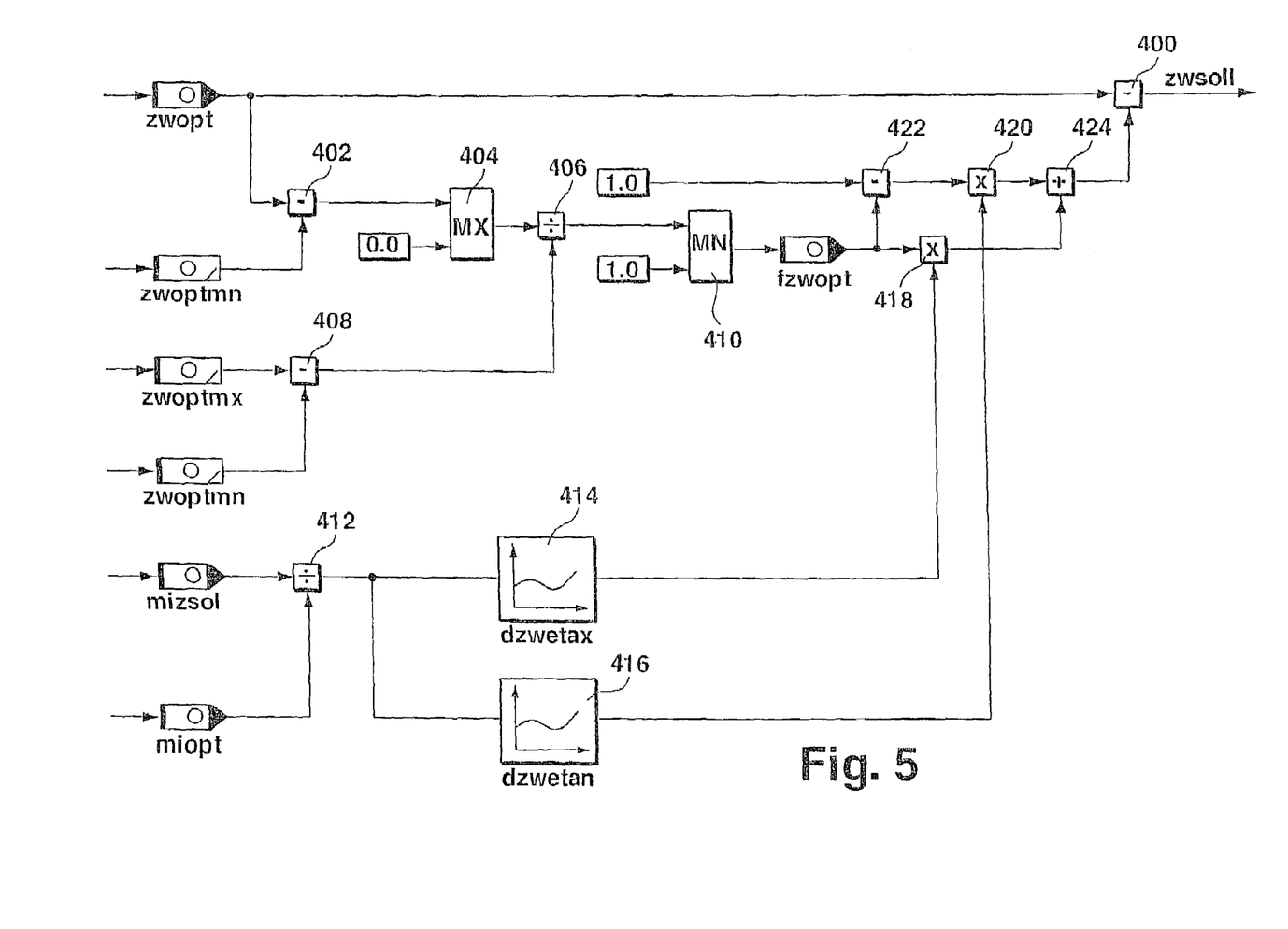
FIG. 5 shows a flow chart for determining setpoint ignition angle zwsoll.

FIG. 5 illustrates the generation of setpoint ignition angle zwsoll, an exemplary embodiment for calculating factor fzwopt being shown there as well. In this flow chart, too, the various blocks represent program steps, program parts or programs, while the connecting lines represent the flow of information. First, the optimum ignition angle is read in and forwarded to a first subtraction point 400 and a second subtraction point 402. In the latter, applicable ignition-angle value ZWOPTMN is subtracted from it. The difference is transmitted to a maximum-value selection step 404, whose second input has the value zero. The greater of the two values is then transmitted as resultant variable to a division point 406. In this division point, the differential value between applicable variables ZWOPTMX and ZWOPTMN, calculated in third subtraction point 408, is divided by the resulting value.

The result is forwarded to a minimum-value selection step 410 in which the smaller of the values 1 and the result of 406 is output as factor fzwopt. Furthermore, torque-setpoint value mizsoll as well as optimum torque miopt are read in (from an ignition map). In division point 412, the torque setpoint value is divided by the optimum torque and transmitted to two characteristic curves 414 and 416. These characteristic curves, DZWTAX and DZWETAN, are two characteristic curves that represent the ignition angle above (versus) the torque deviation. Here, too, one characteristic curve is predefined for an advanced and the other for a retarded optimum ignition angle. They correspond to the characteristic curves in FIG. 6. The two ignition-angle values determined by the characteristic curves are multiplied by factor fzwopt in multiplication point 418, on the one hand, and multiplied by the value (1-fwzopt), calculated in division point 422, in multiplication point 420, on the other hand. The ignition-angle variables weighted in this manner are added in addition point 424 and deducted from optimum ignition angle zwopt in subtraction point 400. The result is setpoint-ignition angle zwsoll to be set for adjusting the predefined setpoint torque.

Here, too, the values of the two characteristic curves 414 and 416 are weighted as mentioned earlier, as a function of the selection of the optimum ignition angle with respect to the limit values.

Figure 7:
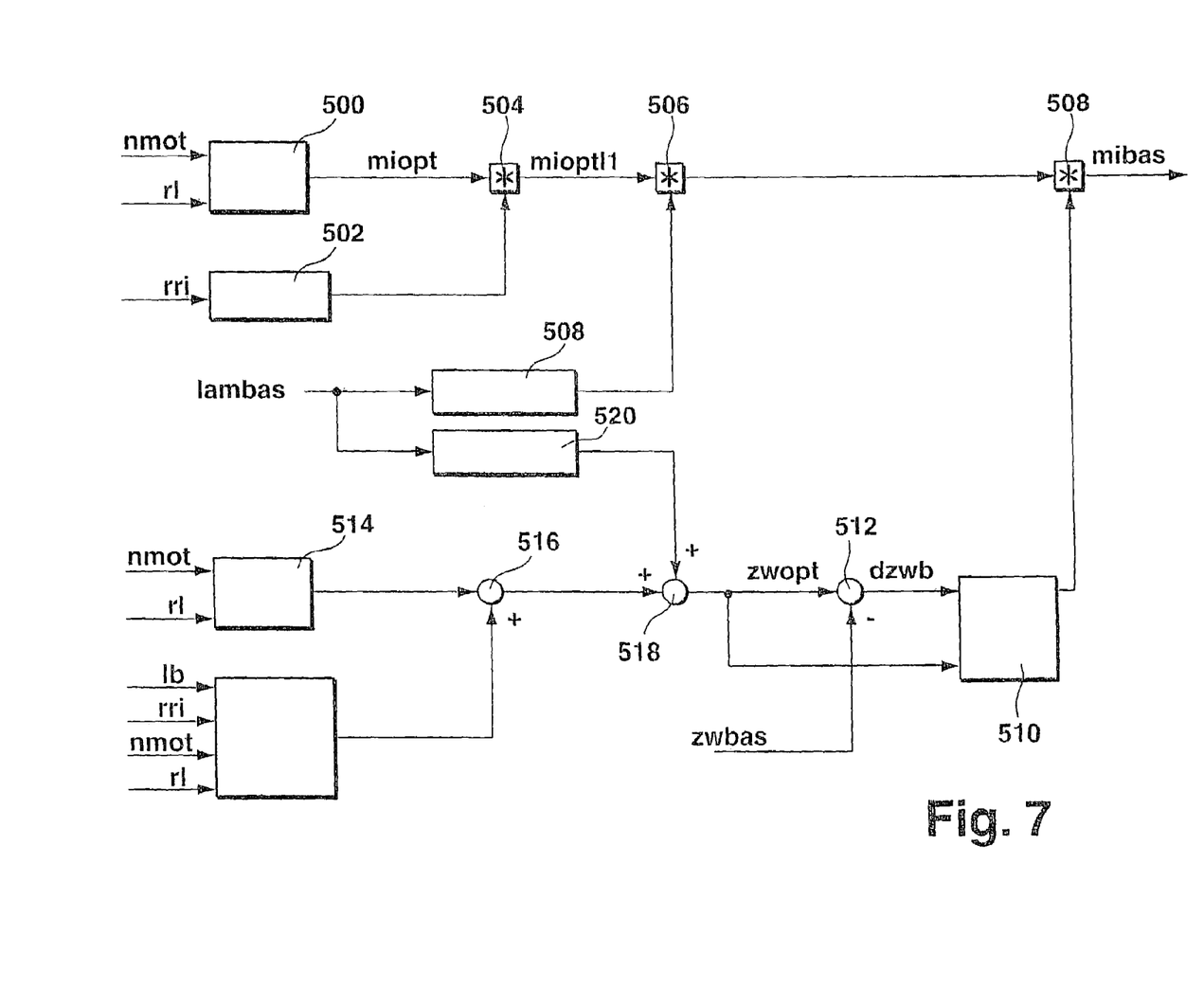
FIG. 7 shows another exemplary embodiment of the torque model for determining an actual torque.

FIG. 7 shows a flow chart for a torque model using the aforementioned correlations for a basic operating point. In addition to the difference from optimum ignition angle and basic ignition angle (instantaneous ignition angle), variable zwopt, as an example of a variable for characterizing the combustibility of the mixture, is also entered into the block for calculating the ignition-angle efficiency.

As mentioned before, an efficiency is calculated in ignition map 500 as a function of engine speed Nmot and instantaneous charge rl, and in characteristic curve 502 as a function of inert-gas rate rri, this efficiency being multiplied in multiplication point 504 by the optimum torque value generated in ignition map 500. Optimum torque value mioptll, ascertained therefrom, is multiplied in multiplication point 506 by a lambda efficiency, which is generated in characteristic curve 508 as a function of basic lambda value lambas to be set in the individual operating point without corrections possibly input from the outside. The multiplication result in 506 is subjected to another multiplication in 508 in which the torque value is multiplied by the ignition-angle efficiency etazwist generated in 510. The result is basic torque mibas for the instantaneous operating point.

Analogously to the afore-mentioned representation, the ignition-angle efficiency is determined as a function of the difference, calculated in 512, between optimum ignition angle zwopt and basic ignition angle zwbas as well as the directly supplied optimum ignition angle zwopt. The optimum ignition-angle value is generated in an ignition map 514 as a function of engine speed and charge; this optimum ignition angle is corrected in a summing point 516 as a function of a correction value determined as a function of charge movement LB, inert-gas rate rri, engine speed Nmot and charge rl. In an additional correction point 518, the corrected optimum ignition angle is corrected by a correction value that is a function of the lambda value, the correction value being generated in characteristic curve 520 as a function of the basic lambda value. Optimum ignition-angle value zwopt corrected in this manner is then evaluated in order to generate the ignition-angle efficiency in 510 and to determine the instantaneous torque.

Instead of the afore-described weighting using two torque characteristics, more than two torque characteristics are predefined in other embodiments and evaluated accordingly.

The invention claimed is:

1. A device for controlling an internal combustion engine, comprising:
a control unit to determine, with a torque model, at least one of at least one instantaneous torque variable and at least one actuating variable of the internal combustion engine from a setpoint value, wherein the torque model includes at least one basic variable that is determined under predefined standard conditions and is corrected as a function of an actual setting of the internal combustion engine, and the basic variable represents an optimum torque, which is corrected by an efficiency for a conversion of chemical energy into mechanical energy; and
determining the efficiency as a function of a deviation between an optimum ignition angle and an instantaneous ignition angle and an additional variable representing a combustion performance of a mixture, wherein to determine the efficiency, various characteristics of the efficiency with respect to the ignition-angle deviation are weighted differently as a function of a position of the optimum ignition angle.

2. A computer program having program-code, which is stored on a computer-readable data carrier, and being executable on a control device having a processor arrangement for controlling an internal combustion engine by performing the following:
determining, with a torque model, at least one of at least one instantaneous torque variable and at least one actuating variable of the internal combustion engine as a function of a setpoint variable, wherein the torque model includes at least one basic variable that is determined under predefined standard conditions and is corrected as a function of an actual setting of the internal combustion engine, and the basic variable represents an optimum torque, which is corrected by an efficiency for a conversion of chemical energy into mechanical energy; and
determining the efficiency as a function of a deviation between an optimum ignition angle and an instantaneous ignition angle and an additional variable representing a combustion performance of a mixture, wherein to determine the efficiency, various characteristics of the efficiency with respect to the ignition-angle deviation are weighted differently as a function of a position of the optimum ignition angle.

3. A method for controlling an internal combustion engine, the method comprising:
determining, with a torque model, at least one of at least one instantaneous torque variable and at least one actuating variable of the internal combustion engine as a function of a setpoint variable, wherein the torque model includes at least one basic variable that is determined under predefined standard conditions and is corrected as a function of an actual setting of the internal combustion engine, and the basic variable represents an optimum torque, which is corrected by an efficiency for a conversion of chemical energy into mechanical energy; and
determining the efficiency as a function of a deviation between an optimum ignition angle and an instantaneous ignition angle and an additional variable representing a combustion performance of a mixture, wherein to determine the efficiency, various characteristics of the efficiency with respect to the ignition-angle deviation are weighted differently as a function of a position of the optimum ignition angle.

4. The method of claim 3, wherein the optimum ignition angle is determined as a function of a fresh-air charge, an engine speed and at least one additional variable.

5. The method of claim 3, wherein the variable representing the combustion performance is the optimum ignition angle.

6. The method of claim 3, wherein the at least one additional variable includes at least one of an inert-gas rate, lambda, and a variable for a charge movement.

7. The method of claim 3, wherein the optimum ignition angle is corrected as a function of at least one of an inert-gas rate, charge-movement effects and an instantaneous working point of the internal combustion engine.

8. The method of claim 3, wherein the optimum ignition angle is corrected as a function an inert-gas rate, a position of intake and discharge valves or a valve overlap, and an instantaneous operating point of the internal combustion engine.

9. The method of claim 3, wherein a correction of the optimum ignition angle is implemented as a function of a lambda value and an instantaneous load.

10. The method of claim 3, wherein an optimum torque of the internal combustion engine is corrected by taking into account an inert-gas rate and charge-movement effects.

11. The method of claim 10, wherein the correction of the optimum torque is performed as a function of the inert-gas rate and a position of intake and discharge valves.

* * * * *